United States Patent [19]

Profet

[11] 4,437,183

[45] Mar. 13, 1984

[54] METHOD AND APPARATUS FOR DISTRIBUTING CONTROL SIGNALS

[75] Inventor: Gary A. Profet, Watertown, Conn.

[73] Assignee: General DataComm Industries, Inc., Danbury, Conn.

[21] Appl. No.: 224,340

[22] Filed: Jan. 12, 1981

[51] Int. Cl.³ .............................................. H04J 3/12
[52] U.S. Cl. .................................. 370/110.1; 370/95; 370/111
[58] Field of Search .................. 370/110.1, 95, 96, 44, 370/111

[56] References Cited

U.S. PATENT DOCUMENTS

| | | | |
|---|---|---|---|
| 3,597,548 | 8/1971 | Drinnan | 370/110.1 |
| 3,710,056 | 1/1973 | Tomozawa | 370/110.1 |
| 3,982,074 | 9/1976 | Clark | 370/95 |

*Primary Examiner*—Marshall M. Curtis
*Attorney, Agent, or Firm*—Pennie & Edmonds

[57] ABSTRACT

A method and apparatus are described in which the control signals for a data channel are transmitted along with the channel aaddress. The control signal and its address are transmitted on a bit interleaved basis in response to CONTROL select signals that are generated as part of the frame. In accordance with the invention, the CONTROL select signals are distributed relatively uniformly throughout the frame. At the receiver, the bits of the control signal and its address are reassembled and the address is used to route the control signal to its proper channel. Further, the bandwidth assigned to control signaling is increased by inserting CONTROL select signals in all time slots that are available in the frame after the necessary channel select signals and other overhead select signals have been assigned. This technique is particularly advantageous in a system having a fixed aggregate transmission bandwidth, variable loads and the capability of automatically reconfiguring the frame.

10 Claims, 6 Drawing Figures

METHOD AND APPARATUS FOR DISTRIBUTING CONTROL SIGNALS

CROSS REFERENCES TO RELATED APPLICATIONS

This application is related to the following concurrently filed applications: "Automatic Framing in Time Division Multiplexer", Ser. No. 224,339; "Method and Apparatus for Establishing Frame Synchronization", Ser. No. 224,338; "Method and Apparatus for Overhead Signaling", Ser. No. 224,335; and "Method and Apparatus for Interleaving Control Signals", Ser. No. 224,337. Each of these applications is assigned to General DataComm Industries, Inc. and is incorporated herein by reference.

TECHNICAL FIELD

This relates to a method and apparatus for operating a time division multiplexer (TDM) system and, in particular, a method and apparatus for distributing control signals in such a system.

BACKGROUND ART

In a typical TDM system, a transmitter samples pulse signals of relatively low pulse repetition frequency from various data sources or channels and interleaves them with one another to form an aggregate data stream that is transmitted by a high speed aggregate channel to a remote receiver. Ordinarily, the TDM transmitter inserts the signals representative of a single bit or a single character in a single time slot in the aggregate data stream and interleaves the signals from different channels on a bit-by-bit or character-by-character basis so that adjacent time slots contain signals from different channels. However, different size blocks of signals can be used if desired. At the receiver, the individual bits or characters are separated from one another and allocated to various low frequency data channels similar to those at the transmitter.

To permit proper decoding of the data stream at the receiver, the transmitter interleaves the signals from the various data channels in accordance with a fixed schedule which it repeats endlessly and the receiver uses the same schedule to decode the data stream. Each cycle of the schedule is called a frame or an aggregate frame. In addition to data signals, each frame ordinarily includes synchronization signals called frame sync words and various control signals, both for individual channels and for the entire TDM system. Typically, the synchronization and control signals take up a small portion (less than 5%) of the total frame which is referred to as the overhead. To simplify the generation of the signals used to select the particular data channel from which a bit or character is to be transmitted, it is customery to sample the data channels in a fixed pattern which is repeated numerous times within each frame. Each such cycle of repetition is called a subframe.

While the control signals take up a relatively small portion of the aggregate frame, transmission of these signals causes numerous problems in the efficient operation of the TDM.

Because they are part of the overhead, the transmission of control signals reduces the efficiency of data transmission. In an effort to achieve higher efficiency, system designers tend to design frames which do not provide for enough control signaling. As a result, channels with lots of control signal activity are likely to monopolize the available space in the frame for control signaling and/or the channel response to control signaling is likely to be slow.

Further, in prior art systems which use a frame comprising a large number of identical subframes and one relatively small non-repeating portion, the practice is to allocate control signaling to one or more groups of contiguous time slots in the non-repeating portion of the frame and to assign each of these time slots to a specific channel. Such an approach, however, ignores the differences in control signaling activity that are almost certain to exist between channels. In addition, since there is very little data transmitted in the non-repeating portion of the frame, channel data accumulates in the individual channel buffers while the control signals are being sent. While large buffers can be used to eliminate any possibility of data loss as a result of such buffer slippage, the use of large buffers increases the time it takes to send a signal from one end of the system to another. In looped keyboard display systems where a keystroke entered at a local keyboard is displayed on a local CRT by a remotely located computer, the delay in sending the keystroke to the computer and back to the display may be intolerable.

SUMMARY OF THE INVENTION

To alleviate some of the problems of control signaling, a method and apparatus have been devised in which the control signals for a data channel are transmitted along with the channel address. The control signal and its address are transmitted on a bit interleaved basis in response to CONTROL select signals that are generated as part of the frame. In accordance with the invention, the CONTROL select signals are distributed relatively uniformly throughout the frame. At the receiver, the bits of the control signal and its address are reassembled and the address is used to route the control signal to its proper channel.

Further, in accordance with the invention, the bandwidth assigned to control signaling is increased by inserting CONTROL select signals in all time slots that are available in the frame after the necessary channel select signals and other overhead select signals have been assigned. This technique is particularly advantageous in a system having a fixed aggregate transmission bandwidth, variable loads and the capability of automatically reconfiguring the frame.

BRIEF DESCRIPTION OF THE DRAWINGS

These and other objects, features, elements and advantages of the invention will be more readily apparent from the following detailed description of the drawings in which.

BEST MODE FOR CARRYING OUT THE INVENTION

Figure 1:
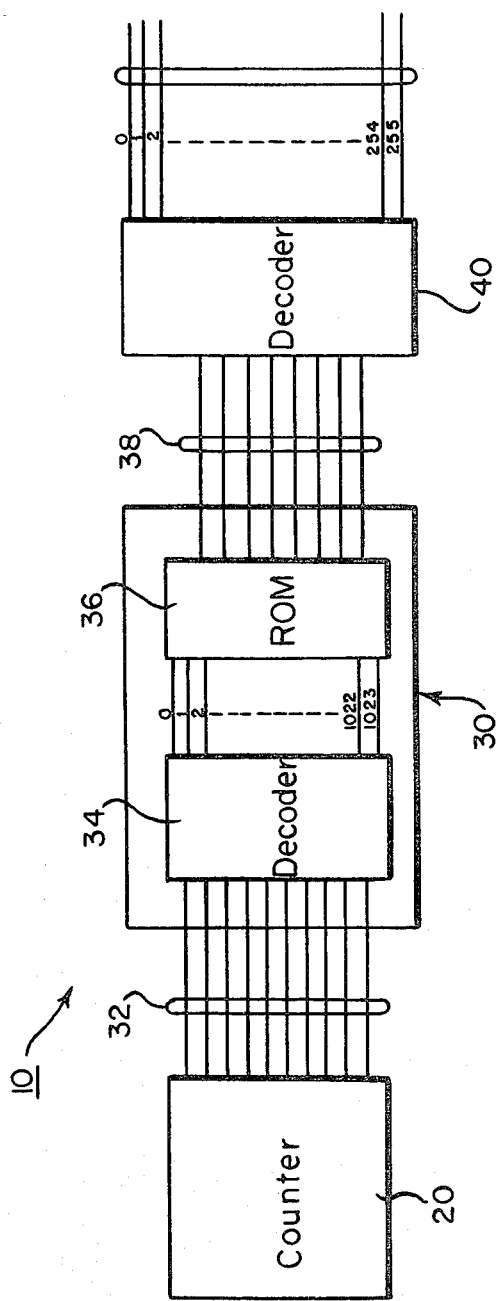
FIG. 1 is a block diagram depicting an illustrative embodiment of a frame generator of the prior art which may be used in the practice of my invention.
Figure 2A:
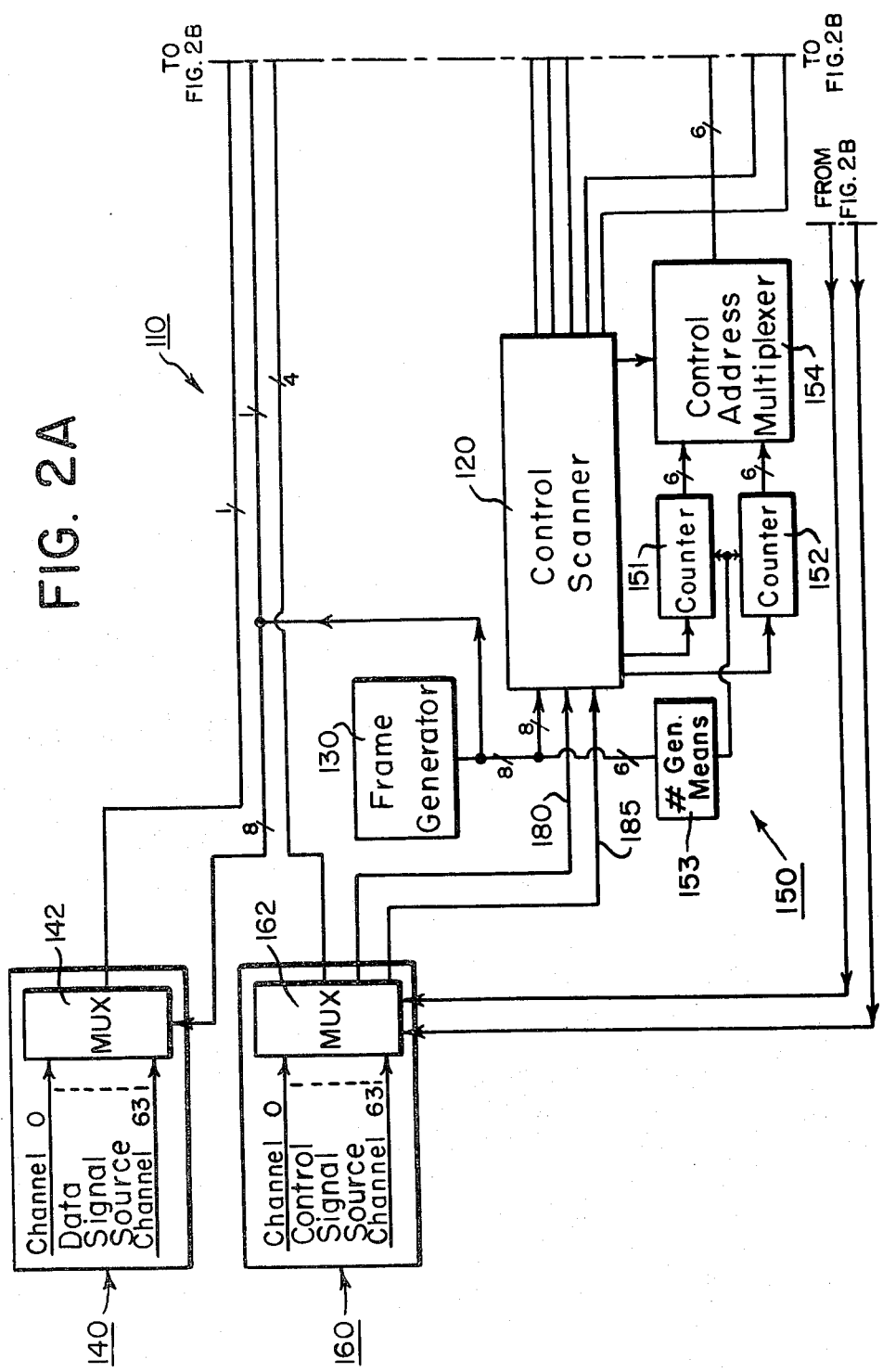
FIG. 2, consisting of FIGS. 2A and 2B, is a block diagram of an illustrative embodiment of portion of a TDM transmitter modified in accordance with the invention.
Figure 2B:
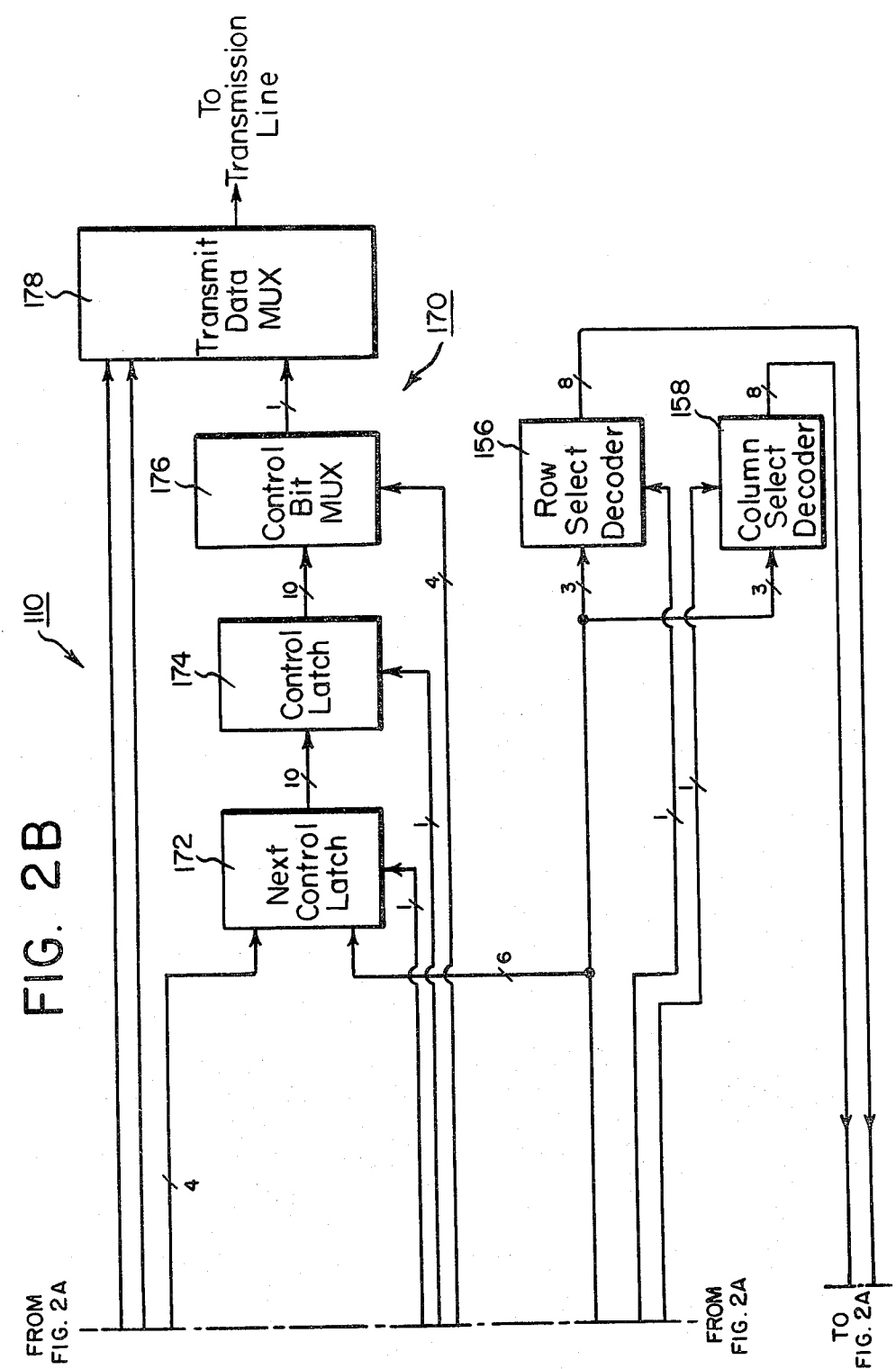
Figure 3:
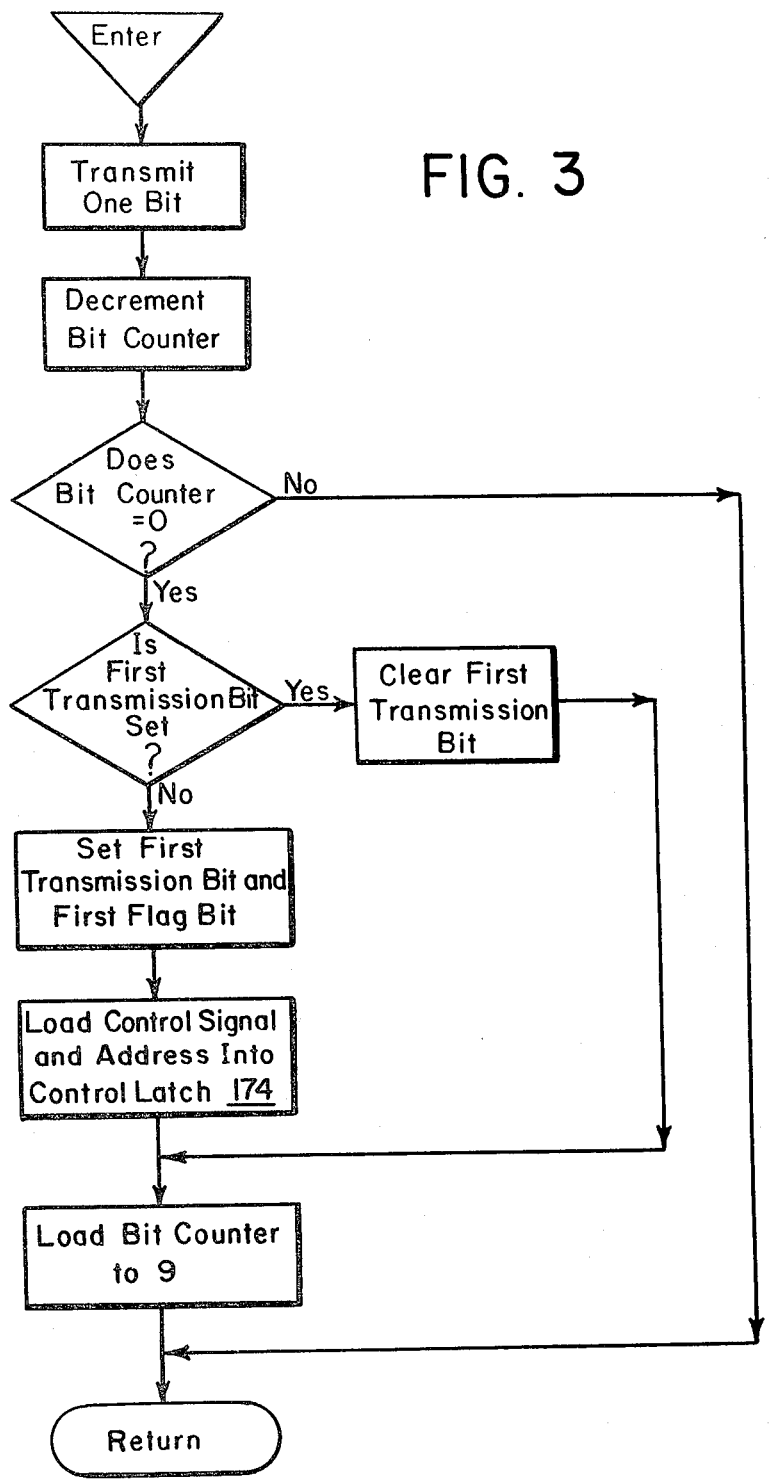
FIG. 3 is a flow chart useful in understanding the operation of a first portion of the apparatus of FIG. 2.

Simplified block diagrams of an illustrative TDM system, a TDM transmitter and a TDM receiver are set forth in FIGS. 1, 2 and 3 respectively, of U.S. Pat. No. 3,632,882 for "Synchronous Programmable Mixed Format Time Division Multiplexer," which is incorporated herein by reference. As shown therein, a plurality of pulse data sources or channels A–X are connected by transmitter multiplexer 100 in time-division multiplex format via a conventional transmission system 101 to a receiver demultiplexer 102 where the interleaved data signals are separated and delivered to appropriate data sinks A–X. Since the pulse repetition rate and the number of bits per character may differ from one source to the next, the data from each source is advantageously stored in a separate buffer register prior to transmission. Data stored in each such register is shifted out by a channel shift clock signal that is applied to the register under control of a channel select signal; and the data signals from the registers are combined by OR gate 210 to produce a composite data signal. Thus the channel select signals determine the particular time slots in the composite data signal which are occupied by data from each channel. In similar fashion at the demultiplexer, channel select signals are supplied to AND gates 300A–300X and to AND gates 301A–301X to select the particular channel into which the shift clock signal shifts the data located at a particular time slot in the composite data signal. As will be appreciated, each station in a TDM system usually comprises both a transmitter and a receiver for two way communication between the stations of the system.

Appropriate channel select signals for the transmitter and the receiver may be generated in many ways. For example, the channel select signals may be stored in a programmable read only memory and the signals may be read out by accessing the individual addresses of the memory serially using a binary counter. This, as shown in FIG. 1, a frame generator 10 might comprise a recycling binary counter 20, a memory 30 and a decoder 40. The memory might be a 1KX8 bit memory with ten parallel input lines 32, a 10-line-to-1024 line decoder 34, a read only memory matrix 36 having 1,024 address lines to memory locations which are addressed one at a time and eight parallel binary output lines 38. When the memory is enabled, the signal on the ten input lines is decoded to activate a single address line to the memory matrix. This produces a binary output signal on the eight output lines in accordance with the information stored at the address in the memory matrix. These output lines are then applied to decoder 40 which converts a parallel binary signal on its eight input lines to an output on one of as many as 256 output lines. Of these output lines, some are channel select lines which are used to enable channel select gates in a multiplexer. Such gates are shown as elements 200A–200Z and 201A–201Z in the transmitter multiplexer 100 depicted in FIG. 2 of the U.S. Pat. No. 3,632,882 and elements 300A–300X and 301A–301X in receiver multiplexer 102 of FIG. 3 of that patent. Other output lines are available to enable gates for control and synchronization signaling.

Each data channel uses a set of control signals for signaling between the customer's terminals at either end of the channel. These control signals typically are one or more of the standard EIA signals including request to send, clear to send, data set ready, data terminal ready and the like. Typically each channel is assigned one or more time slots in the frame for the exclusive purpose of transmitting its control signals. As will be apparent, such a protocol is wasteful of transmission bandwidth if there are no control signals to be sent and may not be adequate to cope with large amounts of control signal activity.

In accordance with the present invention, the control signals for a data channel are transmitted along with the channel address. These signals are transmitted on a bit interleaved basis in response to CONTROL select signals that are generated as part of the frame. At the receiver, the bits of the control signal and its address are reassembled and the address is used to route the control signal to its proper channel. Further in accordance with the invention, the CONTROL select signals are distributed throughout the frame, advantageously by inserting CONTROL select signals in all time slots that are available in the frame after the necessary channel select signals and other overhead signals have been assigned.

Illustrative TDM apparatus 110 for controlling the transmission of control signals in accordance with the invention is depicted in block diagram form in FIG. 2. As will be apparent, this apparatus interleaves the signals from the different data channels on a bit-by-bit basis. Apparatus 110 comprises a control scanner 120, a frame generator 130, a data signal source 140, an addressing means 150, a control signal source 160, a transmission means 170, a first signal bus 180 and a second signal bus 185. The capacity of the apparatus of FIG. 2 is large enough to accommodate up to 64 separate data channels; and the modification of the apparatus to accommodate other numbers of channels will be obvious. To avoid unnecessary detail, FIG. 2 does not depict numerous elements of a TDM transmitter which are not part of this invention. For convenience the number of lines in the connection between blocks is represented schematically by the number followed by a slash mark.

The invention may be practiced with any type of frame generator 130 which produces a multiplicity of output signals, some of which are used to select data channels for transmission and others of which are used to initiate control and/or synchronization signaling. Illustratively, frame generator 130 is similar to that of FIG. 1. Specific details of a frame generator which preferably is used with the invention are set forth in the above referenced application "Automatic Framing in Time Division Multiplexer". By way of example, a portion of the contents of the memory of frame generator 130 is set forth in Table 1.

TABLE 1

| Memory Location | 7 | 6 | 5 | 4 | 3 | 2 | 1 | 0 | Function |
|---|---|---|---|---|---|---|---|---|---|
| 395 | 0 | 0 | 0 | 0 | 0 | 0 | 0 | 1 | CH1 Select |
| 396 | 1 | 1 | 0 | 0 |   |   |   | 1 | CONTROL |
| 397 | 0 | 0 | 0 | 0 | 0 | 0 | 0 | 1 | CH1 Select |
| 398 | 0 | 0 | 0 | 0 | 0 | 0 | 1 | 0 | CH2 Select |
| 399 | 0 | 0 | 0 | 0 | 0 | 0 | 1 | 1 | CH3 Select |
| 400 | 0 | 0 | 0 | 0 | 0 |   | 0 | 0 | CH4 Select |
| 401 | 1 | 1 | 0 | 0 |   |   |   | 1 | CONTROL |
| 402 | 0 | 0 | 0 | 0 | 0 | 0 | 0 | 1 | CH1 Select |
| 403 | 0 | 0 | 0 | 0 | 1 |   | 0 | 1 | CH5 Select |
| 404 | 0 | 0 | 0 | 0 | 1 |   |   | 1 | CH7 Select |
| 405 | 0 | 0 | 0 | 0 |   | 0 | 0 | 1 | CH9 Select |
| 406 | 1 | 1 | 0 | 0 |   |   | 1 | 1 | CONTROL |
| 407 | 0 | 0 | 1 | 1 |   |   |   | 0 | CH62 Select |
| 408 | 0 | 0 | 1 | 1 |   |   |   | 1 | CH63 Select |

As shown in FIG. 2, the eight output lines of frame generator 130 are coupled to control scanner 120, and to data signal source 140. Six of the lines from generator 130 are connected to means 153 for determining the largest channel number. One of the lines from frame generator 130 is also connected to a transmit data multiplexer 178 in transmission means 170.

Data signal source 140 comprises the 64 individual channels that are served by the TDM and a multiplexer 142 which selects for transmission one bit of the data present on one channel in accordance with the channel select signal supplied from frame generator 130. Further details of an illustrative multiplexer 142 are disclosed in U.S. Pat. No. 3,632,882. As will be apparent, to control channel select gates 200A–200Z and 201A–201Z of the multiplexer of the '882 patent, it will be necessary to decode the address signals supplied from frame generator 130 of the present invention.

Addressing means 150 is used to address individually each one of the 64 channels which may be connected to the TDM. It comprises first and second counters 151, 152, means 153 for generating the largest channel number, a control address multiplexer 154, a row select decoder 156 and a column select decoder 158. Generating means 153 comprises latches and a comparator which read the channel select signals from frame generator 130 and determine the number of the highest channel. This number is loaded into counters 151, 152 at the beginning of each cycle of the counter. Under the control of control scanner 120, multiplexer 154 uses the count on either counter 151 or counter 152 to address decoders 156, 158. Since six binary address lines are needed to address the 64 data channels, counters 151 and 152 each have a capacity of 64 and have six output lines by which their instantaneous count is transferred to control address multiplexer 154. As indicated in FIG. 2, three of these output lines are used to address decoder 156 and the other three are used to address decoder 158. Each decoder is a 1-of-8 decoder which produces an output signal on one of eight lines in accordance with the binary signal presented in parallel on its three input lines. Illustratively, the eight output lines from decoder 156 are row select lines and those from decoder 158 are column select lines. Counters 151, 152 may be implemented with pairs of 169-type synchronous counters; and multiplexer 154 may be a pair of 157-type quad 2-input multiplexers. Generating means 153 may use 377-type octal D flip-flops and a pair of 85-type 4 bit comparators. Decoders 156, 158 may be 138-type 1-of-8 decoders.

Control signal source 160 comprises the individual channels that are multiplexed by the TDM and a multiplexer 162 which selects for transmission the control signals present on one channel in accordance with the address supplied on the row select and column select address lines from decoders 146, 148. Again the multiplexer may be similar to that described in U.S. Pat. No. 3,632,882. As shown in FIG. 2, four control signal lines are used in the preferred embodiment of the invention, permitting the use of up to 16 binary coded control signals or as many as four uncoded signals.

Transmission means 170 comprises a next control latch 172, a control latch 174, a control bit multiplexer 176 and transmit data multiplexer 178. When a channel is selected for data transmission, transmit data multiplexer 178 transmits a bit of data supplied from data source 140. When a control signal is to be transmitted, multiplexer 178 transmits one bit of that signal supplied from control bit multiplexer 176. Illustratively, each control signal consists of ten bits, four of which are channel control signals and six of which specify the address of the channel to which the controls pertain. The control signal that is being transmitted is stored in control latch 174 and read one bit at a time by control bit multiplexer 176 in response to CONTROL select signals that are generated by frame generator 130 and used by scanner 120 to control the operation of multiplexer 176. While the signal in control latch 174 is being transmitted, the control bits and associated channel address of the next control signal are loaded into the next control latch 172 under control of scanner 120. Latches 172, 174 may be implemented with pairs of 377-type octal D flip-flops. Multiplexer 176 can be a pair of 251 type 8-input multiplexers and multiplexer 178 can be a 153-type dual 4-line to 1-line multiplexer.

An illustrative flow chart for the operation of transmission means 170 is set forth in FIG. 3. In accordance with this flow chart, each control signal is transmitted twice to protect against transmission errors. A bit counter (not shown in FIG. 2) is used to record the number of bits in the control signal that have been transmitted; and a flag bit which is set before any part of the signal is transmitted is used to determine whether the signal has been transmitted once or twice.

Each time frame generator 130 produces a time slot in which a control signal is to be transmitted, the steps depicted in FIG. 3 are executed immediately under control of hard-wired logic in scanner 120. First, scanner 120 causes multiplexer 176 to read the next control bit stored in latch 174 and to forward that bit to multiplexer 178 for transmission. The bit counter is then decremented by one. Next, the control scanner tests to determine if the contents of the bit counter equals zero. If it does not, there is no further operation to be performed and the scanner waits for the next time slot in which a control signal is to be transmitted. If the bit counter equals zero, the scanner tests to determine if the first transmission bit has been set. If it has, the complete control signal has been transmitted for the first time so the scanner clears the transmission bit; and when the next control signal time slot is produced, it loads the bit counter to nine. If the first transmission bit has not been set, the complete control signal has been transmitted twice and the transmission means is ready to receive a new control signal. Thus, the scanner sets the first transmission bit as well as a first flag bit which indicates that a control signal and address has just been loaded from next control latch 172 into control latch 174. The scanner then performs the loading operation represented by the first flag bit it just set; and finally, when the next control signal time slot is produced, it loads the bit counter to nine.

From the foregoing description of the operation of scanner control 120 specific hardware and software implementations of the flowchart of FIG. 3 will be apparent to those skilled in the art. An illustrative hardwired implementation of the above described features of scanner control 120 is set forth in FIG. 4.

Figure 4:
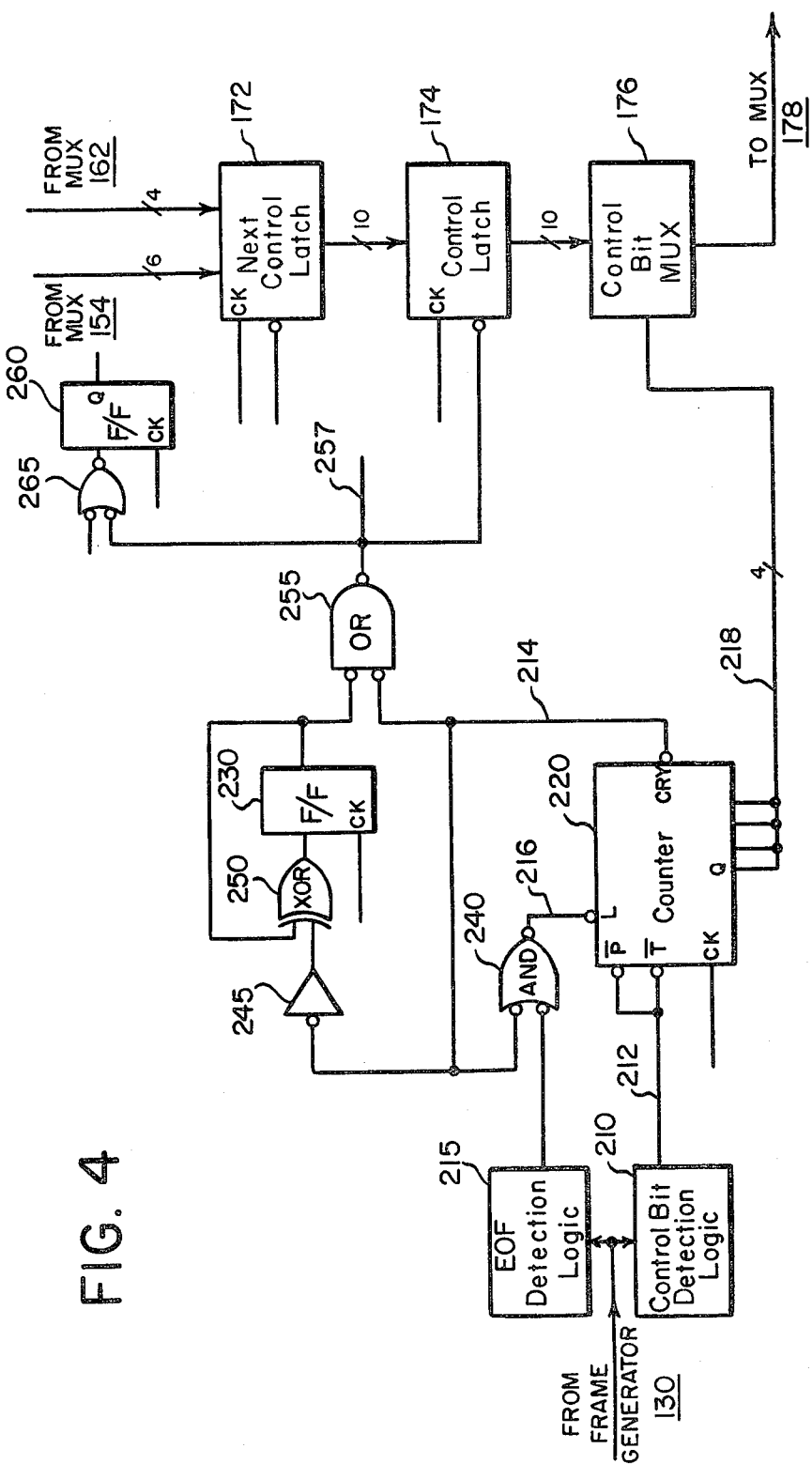
FIG. 4 is a schematic illustration of certain details of the apparatus of FIG. 2.

The apparatus of FIG. 4 comprises a control bit detection logic 210, an end-of-frame (EOF) detection logic 215, a counter 220, a first D-type flip-flop 230, an AND gate 240, an inverter 245, an exclusive OR (XOR) gate 250, and an OR gate 255. It also includes next control latch 172, control latch 174 and control bit multiplexer 176 which are the same devices as depicted in FIG. 2B. In addition, a second D-type flip-flop 260 and an AND gate 265 are used to store the first flag bit.

In accordance with standard practice, the bubbles at the inputs or outputs of many of the elements of FIG. 4 indicate signal inversion (or negation). Further, to facilitate the understanding of the operation of the circuit, AND gates 240 and 265 and OR gate 255 are drawn as OR gates and AND gates, respectively, which are negated at both their input and output.

Counter 220, flip-flops 230, 260 and latches 172, 174 are all clocked together by a common clock signal. Counter 220 is a conventional 169-type counter having count-enable input terminals. $\overline{P}$ and $\overline{T}$, a clock terminal CK, output terminals Q, a carry lookahead terminal CRY, and a load terminal L. The counter is enabled by a low signal on line 212 and is advanced by one for each clock signal received while it is enabled. As will be appreciated by those skilled in the art, whether the count stored in the counter is incremented or decremented is a matter of design choice. In practicing the invention, counter 220 has been decremented from a count of nine. The signal on line 214 from the carry terminal CRY is high except when the counter reaches zero. Output lines 216 from terminals Q strobe control bit multiplexer 176 so as to read out one at a time the ten control bits in control latch 174 in accordance with the count stored in the counter.

Flip-flop 230 stores the first transmission bit. When this bit is set, the output terminal Q of flip-flop 230 is high; otherwise it is low. Flip-flop 260 stores the first flag bit. When this bit is set, the output terminal Q of flip-flop 260 is low; otherwise it is high.

Control bit detection logic 210 and end of frame logic 215 monitor the output of frame generator 130. Whenever the frame generator reaches a time slot allocated to a control bit, it produces a CONTROL select signal such as those shown in Table 1. In the absence of a CONTROL select signal, the output of detection logic 210 on line 212 is high. As a result, the counter operation is disabled and clock signals applied to the CK terminal do not affect the count. When detection logic 210 senses a CONTROL select signal, its output signal goes low, thereby enabling counter 220. As a result, the counter is advanced by one upon receipt of the next clock signal.

If the counter does not reach zero upon being decremented by the clock signal, the signal on line 214 from the carry terminal CRY remains high. As a result, the signal on line 257 from OR gate 255 is high thereby disabling control latch 174. The signal on line 257 is also applied to AND gate 265. When the signal on line 257 is high, AND gate 265 operates so as to apply to input terminal D of flip-flop 260 the signal on line 412. As will be detailed below, the output signal from flip-flop 260 is ordinarily high and the signal on line 412 will ordinarily be high. In these circumstances, there will be no change in the output of flip-flop 260 upon receipt of the next clock signal. As a result, if zero is not reached when the counter is advanced, nothing further happens in the circuitry being discussed; and the circuitry waits for the next CONTROL select signal to be generated by frame generator 130.

If the counter does reach zero, line 214 from carry terminal CRY goes low. If the output of flip-flop 230 is also low signifying that the first transmission bit is not set, line 257 from OR gate 255 goes low. This signal on line 257 enables control latch 174; and the next clock signal received at latch 174 loads the latch with the control signal and address then stored in next control latch 172. When line 257 goes low, a low signal is also applied to AND gate 265 of FIG. 6 causing the input to flip-flop 260 to be low. When the next clock signal is applied to flip-flop 260, the output of flip-flop 260 goes low, thereby setting the first flag bit.

A low signal on line 214 is also inverted by inverter 245 and applied to XOR gate 250. If the output of flip-flop 230 is low (i.e., the transmission bit is not set), the output of XOR gate 250 is high and a high signal is applied to the input of flip-flop 230. When the next clock signal is received, this causes the output of flip-flop 230 to go high. Thus, if the first transmission bit is not set in flip-flop 230, upon receipt of the next clock signal the first transmission bit is set in flip-flop 230, the first flag bit is set in flip-flop 260 and the control signal and its address are loaded from next control latch 172 into control latch 174.

If on the other hand, the first transmission bit is set so that the output of flip-flop 230 is high, the signal on line 257 from OR gate 255 will be high regardless of any change in the signal on line 214 from carry terminal CRY. As a result, no change will take place in the signal applied to control latch 174 or flip-flop 260. However, when the signal on line 214 from terminal CRY goes low, both input terminals to XOR gate 250 will be high, causing the signal applied to the input to flip-flop 230 to go low. When the next clock signal is received by flip-flop 230, this causes the output of flip-flop 230 to go low, thereby clearing the first transmission bit.

Finally, line 214 is also applied to AND gate 240. When the signal on this line goes low, a low signal is produced on an input lead 216 to load terminal L of counter 210. This signal reloads the counter to its initial value of nine upon receipt of the next clock signal. Counter 220 is also reloaded in the same fashion when EOF detection logic 215 detects an end of frame (EOF) signal in the signals produced by frame generator 130.

Figure 5:
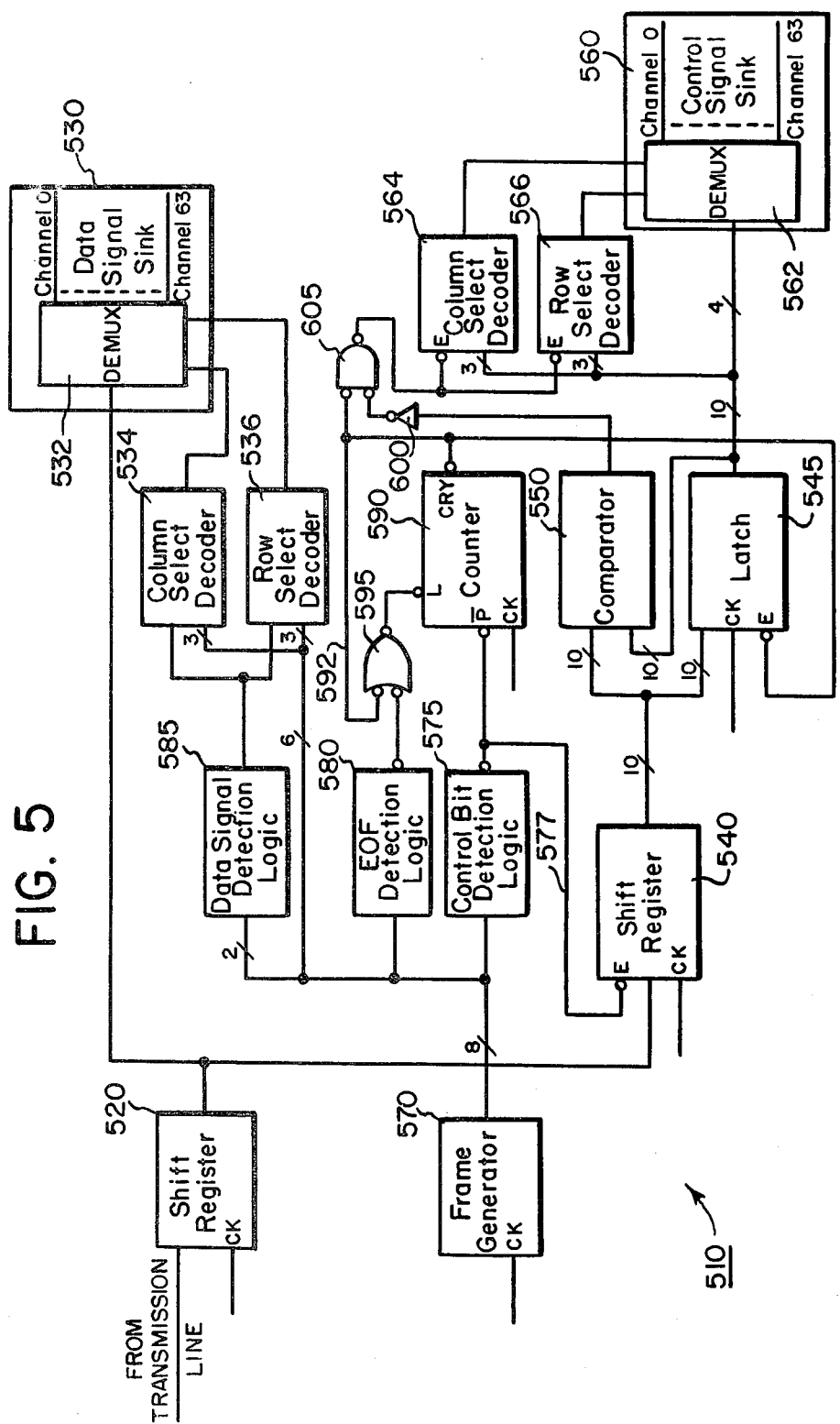
FIG. 5 is a block diagram of an illustrative embodiment of a TDM receiver for receiving signals transmitted by the apparatus of FIG. 2.

FIG. 5 depicts an illustrative TDM receiver 510 for processing the signals received from a transmitter such as that of FIG. 2. As will be apparent, this receiver is synchronous with the transmitter with which it is in communication. Under control of clock signals derived from the received signals, the receiver separates the control signals from the data signals as they are received on a bit-by-bit basis, reassembles the control signals, and routes the data signals and the control signals to their appropriate channels. Apparatus 510 comprises a first shift register 520, a data signal sink 530, data signal column select and row select decoders 534, 536, a second shift register 540, a latch 545, a comparator 550, a control signal sink 560, and control signal column select and row select decoders 564, 566. The apparatus further comprises a frame generator 570, control bit detection logic 575, end-of-frame (EOF) detection logic 580, data signal detection logic 585, a counter 590 and an AND gate 595 which function in similar fashion to frame generator 130, control bit detection logic 210, EOF detection logic 215, counter 220 and AND gate 240 of FIG. 5. Counter 590 reaches zero on every tenth count producing an output on line 592 which enables latch 545 and reloads the counter. The apparatus also comprises an inverter 600 and an OR gate 605, which enable decoders 564, 566 on every twentieth count if the contents of latch 545 and comparator 550 are the same.

Consistent with the apparatus shown in FIG. 2, the apparatus of FIG. 5 is large enough to accommodate up to 64 separate data channels; and the modification of this apparatus to accommodate other numbers of channels will be obvious. To avoid unnecessary detail, FIG. 7 does not depict numerous elements of a TDM receiver which are not part of this invention.

Frame generator 570 is substantially the same as frame generator 130 of FIG. 2 and produces the exact same sequence of output signals, some of which are used to route received signals to the data channels and others of which are used for routing of control and/or synchronization signals.

Data signal sink 530 comprises the 64 individual channels that are served by the TDM and a demultiplexer 532 which routes a bit of received data to an individual channel in accordance with the channel select signal supplied from frame generator 570. Further details of an illustrative demultiplexer 532 are disclosed in U.S. Pat. No. 3,632,882. When data signal detection logic 585 detects a data channel select signal in the output signal from frame generator 570, it enables column select and row select decoders 534, 536 to decode the address in the channel select signal. As will be apparent, the output of decoders 534, 536 controls an array of channel select gates such as gates 300A–300X and 301A–301X of the demultiplexer of the '882 patent.

Control signal sink 560 comprises the individual channels that are served by the TDM and a demultiplexer 562 which routes a control signal to an individual channel in accordance with the address supplied from column select and row select decoders 564, 566. Again the demultiplexer may be similar to that described in U.S. Pat. No. 3,632,882.

When a CONTROL select signal is generated by frame generator 570, this signal is detected by control bit detection logic 575 which causes the signal on line 577 to go low. This signal enables counter 590 and shift register 540; and when the next clock signal is received, one bit of data is shifted into shift register 540 and counter 590 is decremented by one. As noted above, each control signal consists of ten bits and it is transmitted twice to ensure accuracy of transmission. Thus, ten bits must be shifted into register 540 to assemble a complete control signal therein; and two complete control signals are shifted through the register, one immediately after the other.

When counter 590 reaches zero, the low signal on line 592 reloads the counter through AND gate 595 and also enables latch 545. When latch 545 is enabled, the contents of shift register 540 are stored therein upon receipt of the next clock signal. The contents of latch 545 are constantly compared by comparator 550 with the contents of shift register 540. On the tenth count after the contents of shift register 540 are stored in latch 545, counter 590 again reaches zero and the signal on line 592 goes low. At the same time, the contents of shift register 540 should represent the second transmission of the control signal stored in latch 545. If this is the case, the output of comparator 550 goes high. This signal is inverted by inverter 600 and applied to OR gate 605 along with the signal on line 592. Since both signals are low, column select and row select decoders 564, 566 are enabled and the address portion of the control signal stored in latch 545 is decoded by these decoders. The signal on the remaining four lines from latch 545 is the control signal which is routed by multiplexer 562 to the channel specified by the column select and row select decoders 564, 566.

The distribution of CONTROL select signals is preferably relatively uniform throughout the frame. The number of such signals will depend on the bandwidth leftover after all the necessary channel select signals and other overhead signals have been assigned to time slots in the frame. Advantageously, in accordance with the invention all such leftover bandwidth is assigned to control signaling. Inasmuch as distribution schemes for channel select signals typically seek a relatively uniform distribution of such signals, there usually is a relatively uniform distribution of leftover time slots in which the CONTROL select signals may be located.

As will be apparent to those skilled in the art, the invention may be practiced in numerous forms. Of particular note, the distribution and frequency of CONTROL select signals shown in Table 1 are only illustrative and the invention may be practiced using many other distributions and much lower frequencies of CONTROL select signals. Typically a transmitter such as shown in FIGS. 2A and 2B and a receiver such as shown in FIG. 5 are located at each station in a TDM communication system but transmit only or receive only stations may be used. Numerous other variations in the practice of the invention will be apparent.

What is claimed is:

1. In a bit-interleaved time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including control signals, a method of transmitting control signals associated with individual data channels comprising the steps of:
   storing at a transmitter a control signal for a channel together with an address for said channel,
   generating at said transmitter a sequence of select signals that are used to select for transmission either data signals or overhead signals, the select signals for the transmission of control signals associated with individual data channels (hereinafter CONTROL select signals) being distributed throughout said sequence, and
   responsive to each CONTROL select signal, transmitting one bit of the stored control signal and its address.

2. The method of claim 1 further comprising the steps of:
   generating at a receiver the same sequence of select signals that is used at the transmitter,
   for each CONTROL select signal, storing one bit of the signal received at the receiver, and
   when the full control signal and its address are stored at the receiver, using the address to route the control signal to an individual channel.

3. The method of claim 1 wherein each control signal and its address is transmitted twice.

4. The method of claim 1 wherein each control signal and its address is transmitted twice, said method further comprising the steps of:
   generating at a receiver the same sequence of select signals that is used at the transmitter,
   for each CONTROL select signal, storing one bit of the signal received at the receiver,
   comparing the bits received during one transmission of the control signal and its address with the bits received during a second transmission of the control signal and its address, and upon detection of an identity, using said address to route the control signal to an individual channel.

5. In a bit-interleaved time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including control signals, an apparatus for transmitting control signals associated with individual data channels comprising:

means for storing at a transmitter a contol signal for a channel together with an address for said channel, means for generating at said transmitter a sequence of select signals that are used to select for transmission either data signals or overhead signals, the select signals for the transmission of control signals associated with individual data channels (hereinafter CONTROL select signals) being distributed throughout said sequence, and means for transmitting one bit of the stored control signal and its address in response to each CONTROL select signal.

6. The apparatus of claim 5 further comprising:

means for generating at a receiver the same sequence of select signals that is used at the transmitter, means for storing for each CONTROL select signal one bit of the signal received at the receiver, and means for using the address to route the control signal to an individual channel when the full control signal and its address are stored at the receiver.

7. The apparatus of claim 5 wherein each control signal and its address is transmitted twice.

8. The apparatus of claim 5 wherein each control signal and its address is transmitted twice, said apparatus further comprising:

means for generating at a receiver the same sequence of select signals that is used at the transmitter, means for storing for each CONTROL select signal one bit of the signal received at the received, means for comparing the bits received during one transmission of the control signal and its address with the bits received during a second transmission of the control signal and its address, and means for using said address to route the control signal to an individual channel upon detection of an identity.

9. In a bit-interleaved time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, a method of assigning select signals to the time slots of said frame comprising the steps of:

assigning to the time slots of said frame all the select signals required for the transmission of data and the transmission of those overhead signals which are not used for the transmission of EIA-type control signals for individual data channels, and then assigning to all the remaining time slots of said frame select signals for the transmission of EIA-type control signals for individual data channels.

10. In a bit-interleaved time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, a frame of select signals in which the time slots of said frame are filled by first allocating to the time slots of said frame on a highest priority all the select signals required for the transmission of data and the transmission of those overhead signals which are not used for the transmission of EIA-type control signals for individual data channels, said select signals being substantially uniformly distributed in said frame, and then allocating to all the remaining time slots of said frame select signals for the transmission of EIA-type control signals for individual data channels, whereby said select signals for EIA-type control signals are substantially uniformly distributed in said frame.

* * * * *